United States Patent
Kuo et al.

(10) Patent No.: US 9,191,195 B2
(45) Date of Patent: Nov. 17, 2015

(54) CIRCUIT AND METHOD FOR CALCULATING ERROR OF SAMPLING CLOCK, AND SIGNAL RECEIVING CIRCUIT AND METHOD

(71) Applicant: MStar Semiconductor, Inc., Hsinchu Hsien (TW)

(72) Inventors: Chih-Cheng Kuo, Hsinchu County (TW); Wen-Chieh Yang, Hsinchu County (TW); Chu-Hsin Chang, Hsinchu County (TW); Tai-Lai Tung, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/535,599

(22) Filed: Nov. 7, 2014

(65) Prior Publication Data

US 2015/0124913 A1   May 7, 2015

(30) Foreign Application Priority Data

Nov. 7, 2013   (TW) .............................. 102140540 A

(51) Int. Cl.
*H04L 7/04* (2006.01)
*H04L 25/03* (2006.01)
*H04N 21/438* (2011.01)

(52) U.S. Cl.
CPC ................ *H04L 7/042* (2013.01); *H04L 25/03* (2013.01); *H04N 21/4382* (2013.01)

(58) Field of Classification Search
USPC .................. 375/260, 222, 279, 368, 371, 326
See application file for complete search history.

(56) References Cited

U.S. PATENT DOCUMENTS

| | | | | |
|---|---|---|---|---|
| 5,680,421 | A * | 10/1997 | Shiino et al. | 375/368 |
| 6,047,033 | A * | 4/2000 | Chen | 375/326 |
| 8,201,066 | B1 | 6/2012 | Wang | |
| 2004/0071221 | A1* | 4/2004 | Nakada et al. | 375/260 |
| 2004/0114678 | A1* | 6/2004 | Langberg et al. | 375/222 |
| 2007/0177686 | A1* | 8/2007 | Galperin et al. | 375/260 |
| 2008/0273646 | A1* | 11/2008 | Ammar et al. | 375/371 |
| 2012/0170621 | A1* | 7/2012 | Tracy et al. | 375/219 |

OTHER PUBLICATIONS

Taiwan Intellectual Property Office, "Office Action" May 15, 2015.

* cited by examiner

*Primary Examiner* — Eva Puente
(74) *Attorney, Agent, or Firm* — WPAT, PC; Justin King

(57) ABSTRACT

A method for calculating an error of a sampling clock is provided. The sampling clock is used for sampling a signal to generate a first sample data group and a second sample data group. Each of the first and second sample data groups includes a header having a predetermined sequence. The method includes: performing a correlation operation on the first and second sample data groups with data of the predetermined format to obtain first and second correlation results, respectively; comparing the first and second correlation results to generate a sample data group offset; and generating the error of the sampling clock according to the sample data group offset and a time difference between the first and second sample data groups.

14 Claims, 8 Drawing Sheets

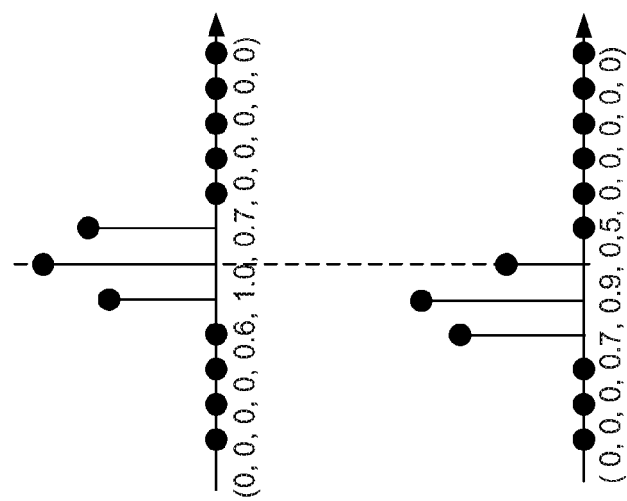
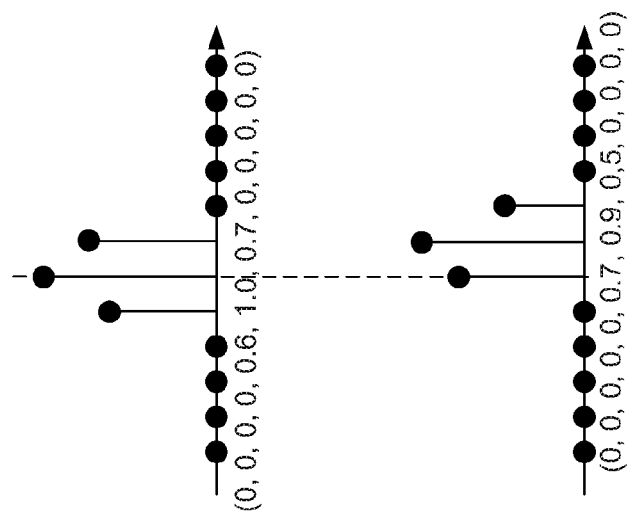
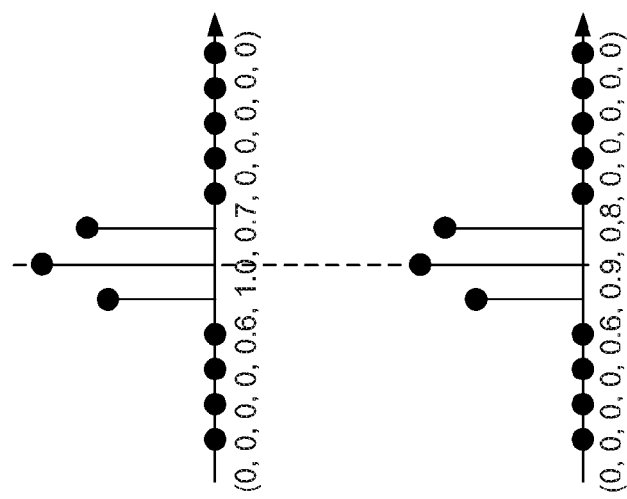
FIG. 5

CIRCUIT AND METHOD FOR CALCULATING ERROR OF SAMPLING CLOCK, AND SIGNAL RECEIVING CIRCUIT AND METHOD

This application claims the benefit of Taiwan application Serial No. 102140540, filed Nov. 7, 2013, the subject matter of which is incorporated herein by reference.

BACKGROUND OF THE INVENTION

1. Field of the Invention

The invention relates in general to a signal receiving circuit and method, and more particularly, to a signal receiving circuit and method that adjusts a sampling clock according to an error of the sampling clock, and a circuit and method for calculating an error of a sampling clock.

2. Description of the Related Art

FIG. 1 shows a schematic diagram of a conventional signal transmission process from a transmitter to a receiver. A signal x(t) is sent from the transmitter, and passes through a channel to form a signal y(t) at the receiver. The equation is as follows: y(t)=x(t)⊗h(t)+w(t), where h(t) represents a multipath fading channel function, and w(t) represents an additive white Gaussian noise (AWGN) function. When x(t) is a multicarrier signal, x(t) can be represented as $$x(t) = \sum_{k=-\infty}^{k=\infty} I_k \cdot P(t - kT_{sym,tx}),$$

where $I_k$ is the $k^{th}$ symbol, P(t) is a pulse shaping function, and $T_{sym,tx}$ is a symbol period at the transmitter.

At the receiver, after sampling the signal y(t) by a sampling speed $1/T_{sam}$, a series of data signals $y(m)=y(t)|_{t=m \cdot T_{sam}}$ are formed. The data signals y(m) are processed by a timing recovery circuit 110 to obtain data signals y(n). The timing recovery circuit 110 down-samples the data signals y(m) by a frequency (i.e., $1/T_{sym,tx}$) corresponding to the symbol period $T_{sym,tx}$ of the transmitter, such that the sampling clocks at the receiver and the transmitter may be synchronized to restore data originally sent from the transmitter. However, the above description gives an ideal situation. Due to circuit production factors, the frequency of the sampling clock at the transmitter is not entirely equal to $1/T_{sym,tx}$. As the receiver does not know the exact sampling clock frequency at the transmitter, the sampling clock frequency at the receiver cannot be set to be identical to that at the transmitter. Further, a frequency previously properly set may change on account of operation environmental factors. As a result, the data signals eventually received by the receiver are $y(n)=y(t)|_{t=n \cdot T_{sym,rx}}$, where $T_{sym,rx}$ is a symbol period at the receiver, and $T_{sym,rx} \neq T_{sym,tx}$. Even a minute difference between the two results in data errors over a long period of time.

SUMMARY OF THE INVENTION

The invention is directed to a signal receiving circuit and a signal receiving method for adjusting an error of a sampling clock.

The present invention discloses a circuit for calculating an error of a sampling clock according to a first sample data group and a second sample data group. Each of the first and second sample data groups includes a header having a predetermined sequence. The circuit for calculating an error of a sampling clock includes: a correlation circuit, configured to perform a correlation operation on the first sample data group and the second sample data group with the predetermined sequence to obtain a first correlation result and a second correlation result, respectively; a comparison circuit, coupled to the correlation circuit, configured to compare the first and the second correlation results to generate a sample data group offset; and a calculation circuit, coupled to the comparison circuit, configured to generate the error of the sampling clock according to the sample data group offset and a time difference between the first and the second sample data groups.

The present invention further discloses a signal receiving circuit that samples a first signal according to a sampling clock to generate a second signal. The second signal includes a first sample data group including a first header and a second sample data group including a second header. The first and second headers have a same predetermined sequence. The signal receiving circuit includes: a clock error calculation circuit, configured to generate an error of the sampling clock according to correlations between the predetermined sequence and the first and second sample data groups as well as a time difference between the first and second sample data groups; and a timing recovering circuit, coupled to the clock error calculation circuit, configured to sample the first signal according to the sampling clock to generate the second signal, and to adjust a frequency of the sampling clock according to the error of the sampling clock.

The present invention further discloses a method for calculating an error of a sampling clock. The sampling clock is used for sampling a first sample data group and a second sample data group. Each of the first and second sample data groups includes a header having a predetermined sequence. The method includes: performing a correlation operation on the first sample data group and the second sample data group with data of the predetermined format to obtain a first correlation result and a second correlation result, respectively; comparing the first and second correlation results to generate a sample data group offset; and generating the error of the sampling clock according to the sample data group offset and a time difference between the first and second sample data groups.

The present invention further discloses a signal receiving method that samples a first signal according to a sampling clock to generate a second signal. The second signal includes a first sample data group including a first header and a second sample data group including a second header. The method includes: generating an error of the sampling clock according to correlations between the predetermined sequence and the first and second sample data groups as well as a time difference between the first and second sample data groups; and adjusting a frequency of the sampling clock according to the error of the sampling clock.

The signal receiving circuit and method of the present invention is capable of calculating an error of a sampling clock at a receiver and accordingly compensating the sampling clock to synchronize the sampling clocks at the receiver and a transmitter, thereby preventing data sample errors resulted from asynchronous sampling clocks. Further, compared to the prior art, the circuit and method for sampling an error of a sampling clock is capable of identifying a sampling frequency offset of sampling clocks at the transmitter and the receiver, and compensating the sampling clock according to the sampling frequency offset to allow the receiver to more accurately obtain data.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5 is a diagram showing comparisons of correlation results of different sample data groups according to an embodiment of the present invention;

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a circuit and method for calculating an error of a sampling clock as well as a signal receiving circuit and method, which are capable of determining and compensating the error of the sampling clock of the signal receiving circuit. For example, the present invention is applicable to television devices compliant to the Advanced Television System Committee (ATSC) standard. In possible implementations, one skilled person in the art may choose equivalent elements or steps to implement the disclosure based on the disclosure of the application. That is, the implementation of the disclosure is not limited in the embodiments disclosed in the disclosure. Further, a part of the elements included in the circuit for calculating an error of a sampling clock and the signal receiving circuit of the disclosure may be individually known elements. Without affecting the full disclosure and possible implementation of the device, details of the known elements are omitted. Further, the signal receiving method may be performed by the signal receiving circuit of the disclosure or an equivalent device, and the method for calculating an error of a sampling clock may be performed by the circuit for calculating an error of a sampling clock of the disclosure or an equivalent device. Without affecting the full disclosure and possible implementation of the method of the disclosure, the description of the method focuses on the steps of the method instead of hardware.

Figure 1:
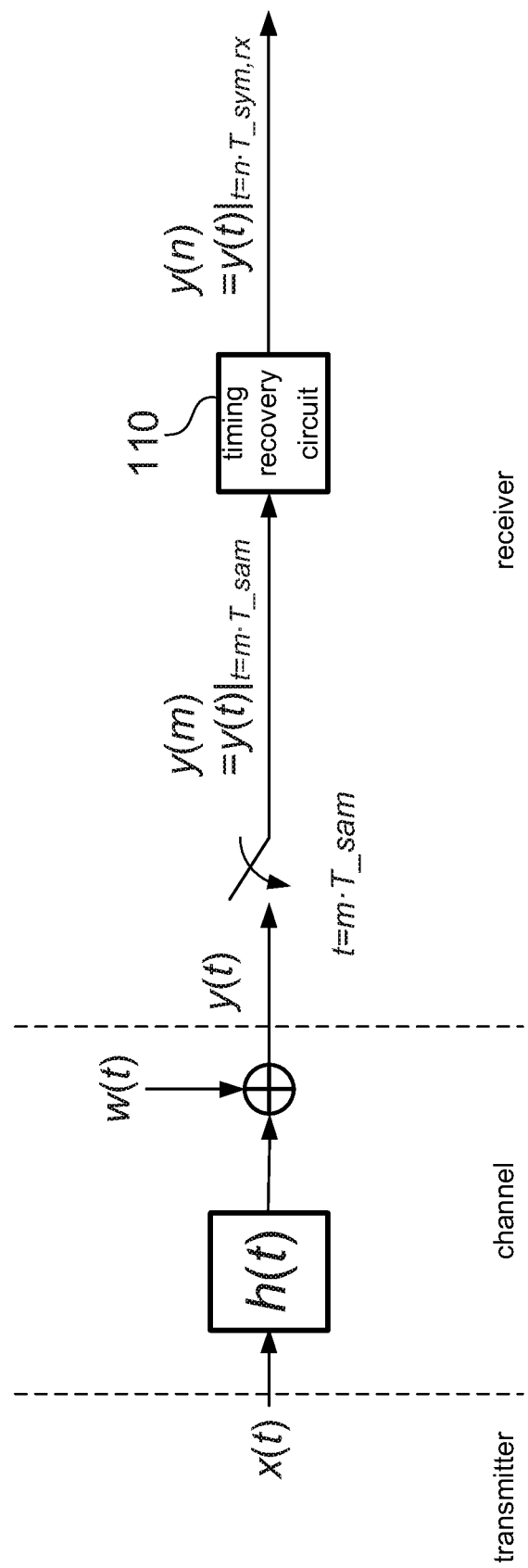
FIG. 1 is a schematic diagram of a conventional transmission process of a signal from a transmitter to a receiver.
Figure 2:
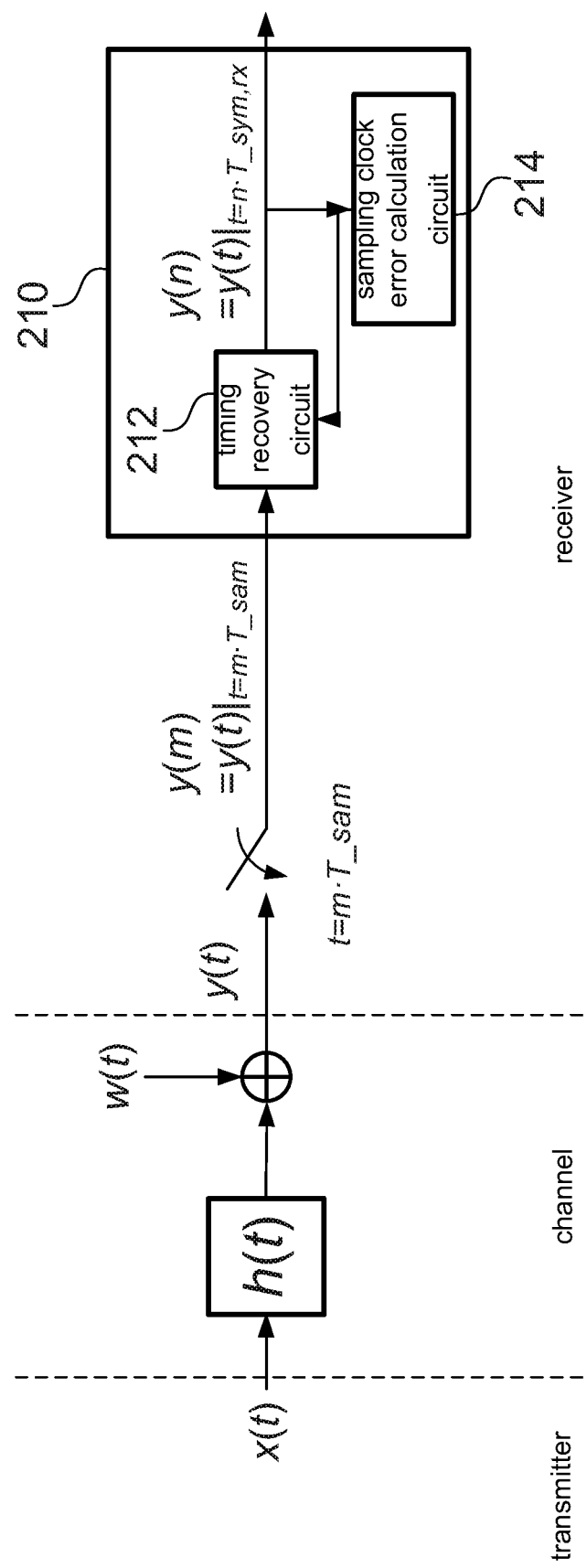
FIG. 2 is a schematic diagram of a signal receiving circuit and a transmission process of the present invention.

FIG. 2 shows a schematic diagram of a signal receiving circuit and a transmission process of the present invention. A signal receiving circuit 210 includes a timing recovery circuit 212 and a sampling clock error calculation circuit 214. The timing recovery circuit 212 down-samples a data signal y(m) according to a frequency (i.e., $1/T_{sym, rx}$) corresponding to a symbol period $T_{sym, rx}$ to obtain a data signal y(n), where the symbol period $T_{sym, rx}$ is predetermined as a symbol period $T_{sym, tx}$ at a transmitter defined by a signal transmission standard. The sampling clock error calculation circuit 214 calculates an error of a sampling clock used by the timing recovery circuit 212 according to the data signal y(n), and feeds the error of the sampling clock back to the timing recovery circuit 212 for the timing recovery circuit 212 to adjust the sampling clock. Details of the timing recovery circuit 212 for adjusting the sampling clock are generally known to one skilled in the technical field, and shall be omitted herein. The data signal y(n) is further forwarded to a rear-end circuit for operations, e.g., processes of equalization and forward error correction, to restore symbols transmitted in the original signal.

Figure 3:
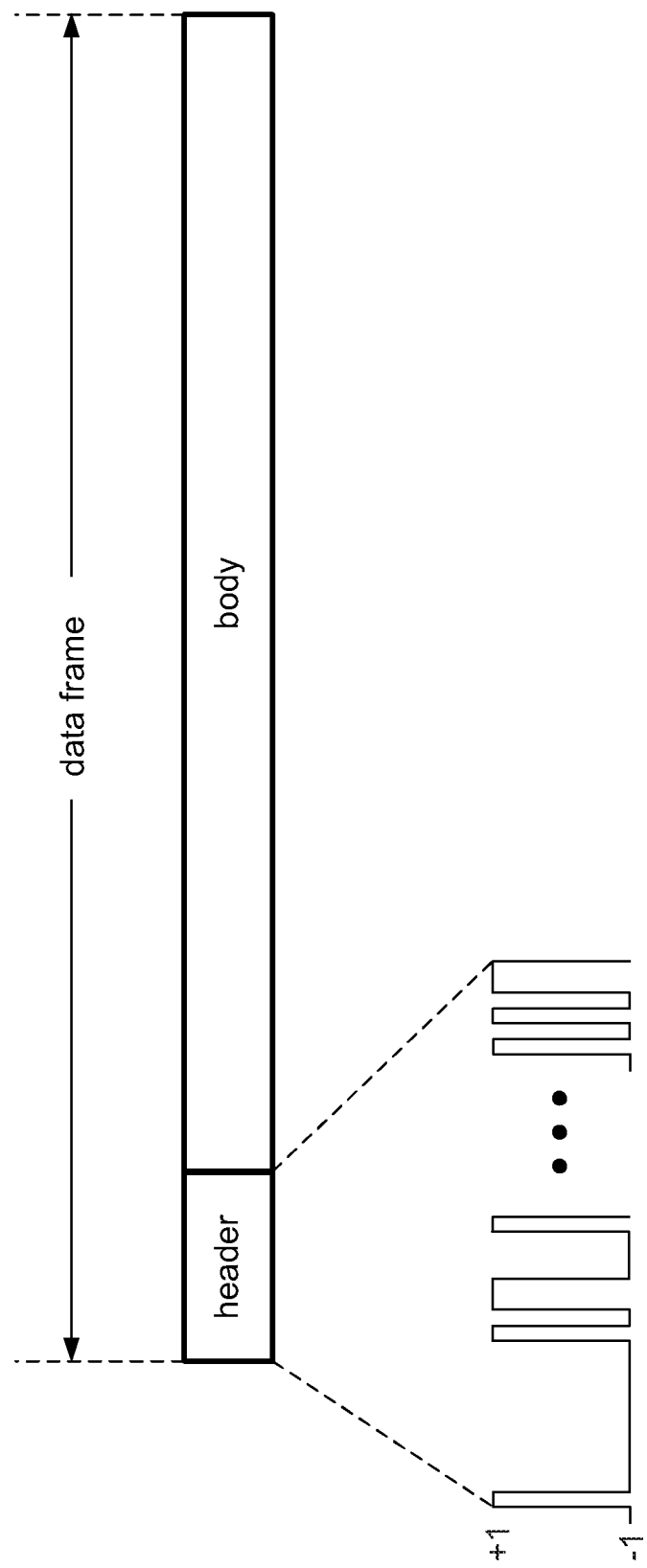
FIG. 3 is a schematic diagram of data constituents of a data frame.

Data transmitted from the signal transmitter is in a unit of a data frame. FIG. 3 shows data constituents of a data frame. Referring to FIG. 3, a data frame includes a header and a body. The body carries data associated with main functions of the signal receiver. For example, when the signal receiving circuit of the present invention is applied to a television device, the data body carries video/audio data associated with a television program. Taking the ATSC standard for example, one data frame is divided into 313 segments, with the length of the header being one of the segments and the body being the remaining 312 segments. The header carries a data frame synchronization signal, which is data having a predetermined sequence. The signal receiver may utilize the data in the predetermined format to identify a start point of a data frame, and to evaluate whether parameters of the signal receiving circuit need to be adjusted. In a preferred embodiment, the signal carried in the header is a pseudo-noise signal, e.g., a PN511 pseudo-noise signal having a length of 511 symbols, with the value of each of the symbols being +1 or −1. The PN511 pseudo-noise signal includes 511 signals having extremely low correlations among one another. Such extremely low correlations means that an extremely correlation result will be obtained when a correlation operation is performed on any two different PN511 pseudo-noise signals. Therefore, the sampling clock error calculation circuit 214 may perform a correlation operation on a header with a known PN511 pseudo-noise signal to evaluate a channel response that a signal has experienced.

At the signal receiver, the data of one data frame is sampled by the timing recovery circuit 212 to generate a sample data group. Since data is transmitted in sequential data frames, one sample data group is closely followed by another sample data group at the signal receiver. Further, the lengths of the data frames are constant, so that the sample data groups also include the same numbers of sets of data (i.e., symbols). That is, a time interval between any two sample data groups can be calculated according to the period $T_{sym, rx}$ of the sampling clock.

Figure 4:
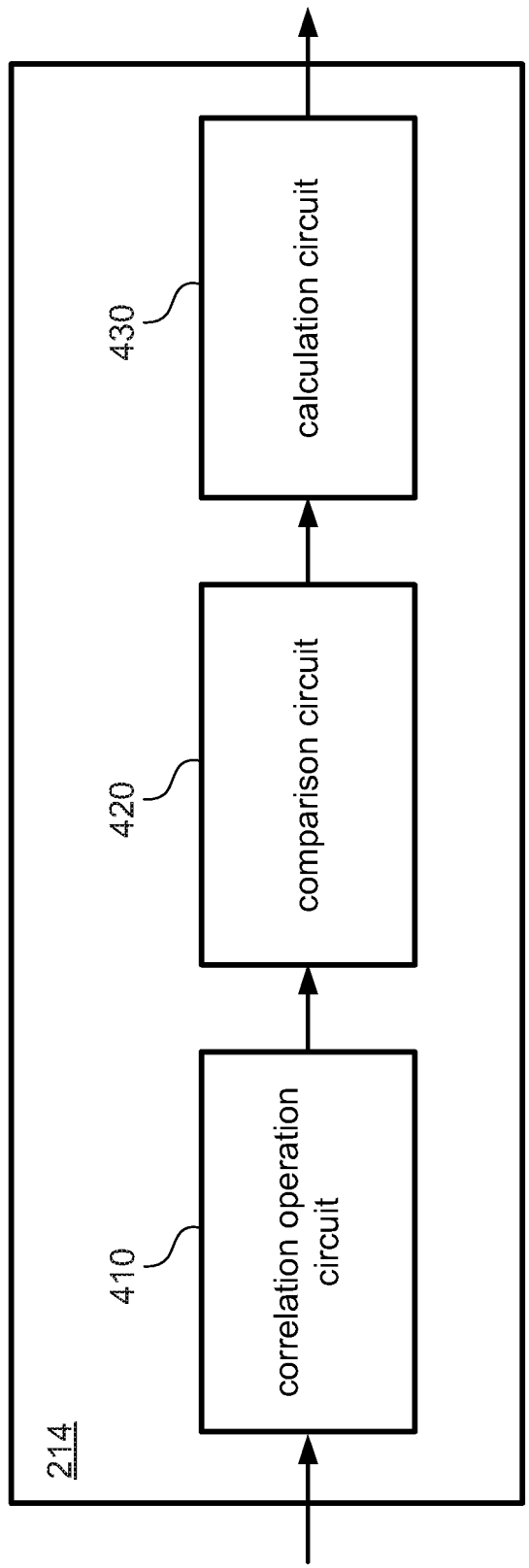
FIG. 4 is a block diagram of a circuit for calculating a sampling clock according to an embodiment of the present invention.

FIG. 4 shows a block diagram of the sampling clock error calculation circuit 214 of the present invention. The sampling clock error calculation circuit 214 includes a correlation circuit 410, a comparison circuit 420 and a calculation circuit 430 that are sequentially coupled. The correlation circuit 410 performs a correlation operation on the data signal y(m) with the predetermined sequence to obtain a correlation result. More specifically, to learn whether the sampling clock contains an error that causes a delay or advance of the sample data, the sampling clock error calculation circuit 214 estimates a data offset between at least two sample data groups through the correlation operation. After performing the correlation operation, the correlation circuit 410 at least generates a first correlation result and a second correlation result respectively corresponding to the two sample data groups, and outputs the first and second correlation results to the comparison circuit 420. That is to say, the comparison circuit 420 at least requires two correlation results for comparison. Thus, to save computation time and resources, the correlation circuit 410 may perform the correlation operation on only two sample data groups of the data signal y(m) with the predetermined sequence. Since the size of the correlation value sufficiently represents an energy level of a signal, the correlation result may also be utilized to represent the channel response and thus be regarded as a channel energy distribution diagram. FIG. 5 shows a diagram of comparisons of correlation results of different sample data groups of the present invention. The left, middle and right comparison diagrams in FIG. 5 show the first and second correlation results corresponding to $T_{sym,\ rx}=T_{sym,\ tx}$, $T_{sym,\ rx}>T_{sym,\ tx}$, and $T_{sym,\ rx}<T_{sym,\ tx}$, respectively. Values in parentheses below the correlation results represent normalized energy values. Each of the correlation results includes a maximum correlation value that corresponds to a main path of the multipath channel. A smaller correlation value next to the maximum correlation value corresponds to a secondary path or an echo path. Others with correlation values 0 represent correlation results of the predetermined sequence and non-header data.

The comparison circuit 420 compares the two correlation results to generate a sample data group offset. Taking the top and bottom correlation results in the middle of FIG. 5 for example, the second correlation result is behind the first correlation result. More specifically, the second sample data group is behind the first sample data group by one sampling period $T_{sym,\ rx}$, which means that the sample data group offset between these two sample data groups is $T_{sym,\ rx}$. After obtaining the sample data group offset, the calculation circuit 430 calculates the error of the sampling clock of $T_{sym,\ rx}$ corresponding to $T_{sym,\ tx}$ according to a time difference between two data frames corresponding to the two sample data groups.

Figure 6:
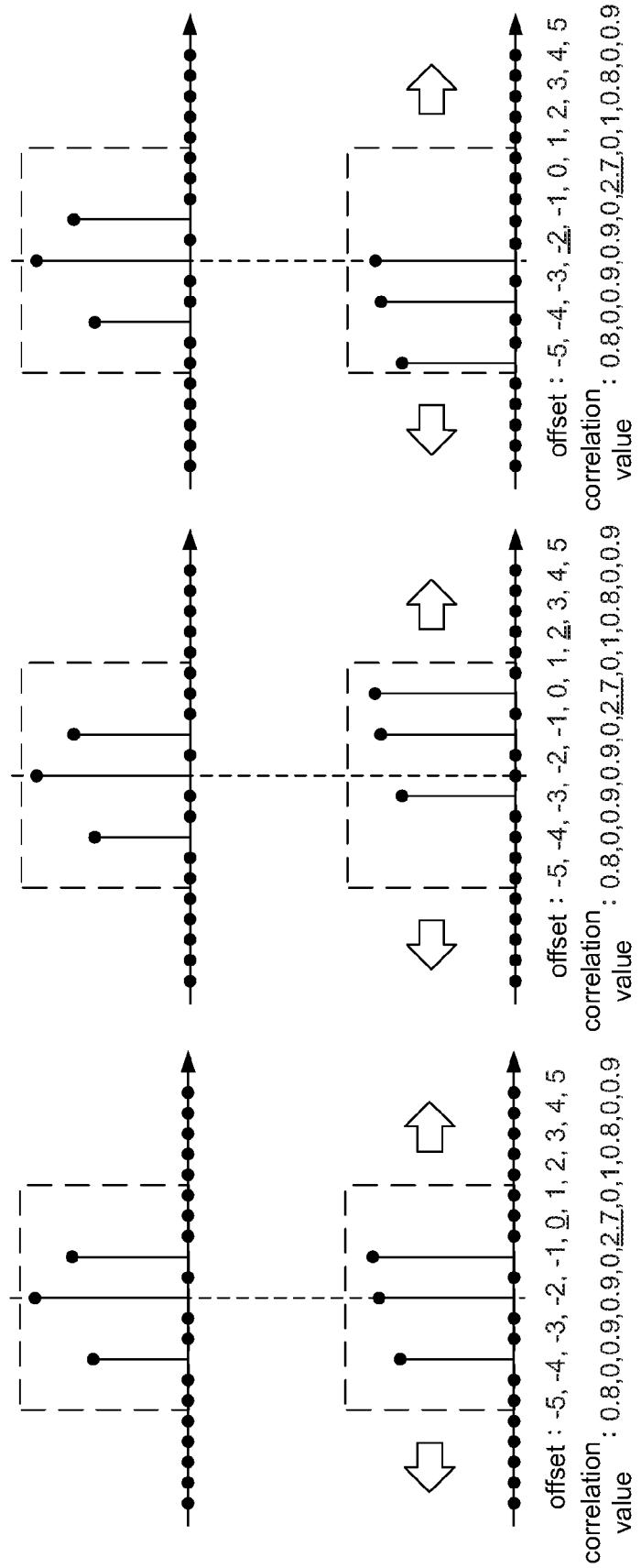
FIG. 6 is another diagram showing comparisons of correlation results of different sample data groups according to an embodiment of the present invention.

FIG. 5 illustrates a situation where the correlation result is relatively simple. When the correlation result gets more complicated, the comparison circuit 420 needs to adjust the comparison approach. FIG. 6 shows another diagram of comparisons of correlation results of different sample data groups according to a preferred embodiment of the present invention. In the embodiment, the comparison circuit 420 defines a comparison window in each of the first and second correlation results. In this example, the size of the comparison result includes 11 correlation values. By regarding the maximum correlation value (corresponding to an offset 0) in the comparison window of the first correlation result as a center, and by regarding an offset 0 in the comparison window of the second correlation result as a center, five offsets to both the right and the left are taken as correlation values, on which the correlation operation is performed with the correlation values selected by the comparison window. In the left comparison diagram, correlation values (0.8, 0, 0.9, 0.9, 0, 2.7, 0, 1, 0.8, 0, 0.9) corresponding 11 offsets (−5, −4, −3, −2, −1, 0, 1, 2, 3, 4, 5) are obtained. It is discovered that the maximum correlation value 2.7 corresponds to the offset 0, which means that the second sample data group is aligned with the first sample data group, i.e., $T_{sym,\ rx}=T_{sym,\ tx}$—the sampling clock at the signal receiver and the sampling clock at the signal transmitter are synchronous. Referring to the middle comparison diagram, a maximum correlation value is generated when the comparison window of the second correlation result moves to a position where the offset is 2, which means that the second sample data group is behind the first sample data group, i.e., $T_{sym,\ rx}>T_{sym,\ tx}$—the period of the sampling clock at the signal receiver is greater than the period of the sampling clock at the signal transmitter. In the right comparison diagram, a maximum correlation value is generated when the comparison window of the second correlation result moves to a position where the offset is −2, which means that the second sample data group is ahead of the first sample data group, i.e., $T_{sym,\ rx}<T_{sym,\ tx}$—the period of the sampling clock at the signal receiver is smaller than the period of the sampling clock at the signal transmitter. The comparison circuit 420 then generates the sample data group offset according to the offset corresponding to the maximum correlation value and the time difference between the two data frames corresponding to the two sample data groups.

Figure 7:
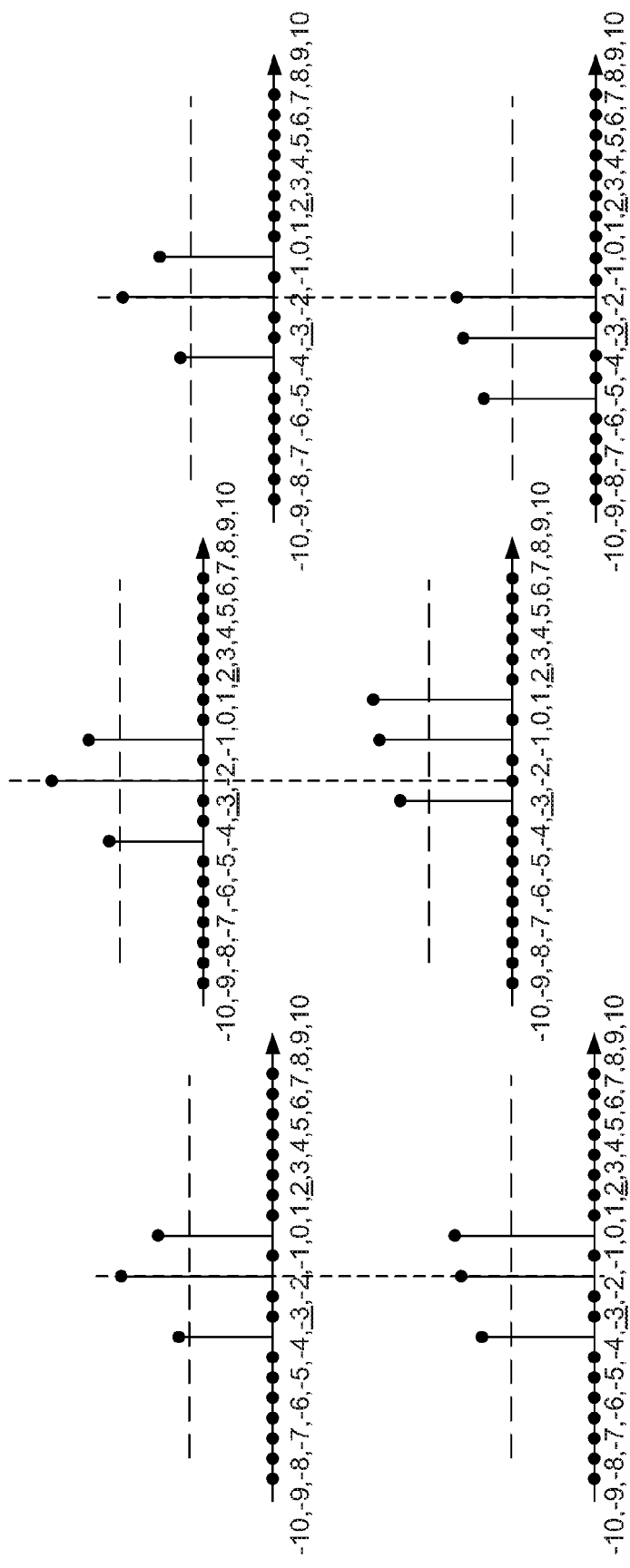
FIG. 7 is yet another diagram showing comparisons of correlation results of different sample data groups according to an embodiment of the present invention.

FIG. 7 shows another diagram showing comparisons of correlation results of different sample data groups. In another preferred embodiment, the comparison circuit 420 numbers all the correlation values regarding the maximum correlation value as a center. That is, the maximum correlation value is a position of number 0, and the correlation values to the right and left of the maximum correlation value are numbered in integers in increasing and decreasing orders, respectively. The comparison circuit 420 filters correlation values of the first correlation result and the second correlation result according to a predetermined value. As shown in FIG. 7, for the first and second correlation results in the left comparison diagram, there are only three correlation values that are greater than the predetermined value indicated by the dotted line. Among the three correlation values filtered from the first correlation result, the leftmost and rightmost correlation values respectively correspond to numbers −3 and 2, and the comparison circuit 420 determines an average of the two numbers to represent the position of the first correlation result. Similarly, among the three correlation values filtered from the second correlation result, the leftmost and rightmost correlation values respectively correspond to numbers −3 and 2, and the comparison circuit 420 determines the average to represent the position of the second correlation result. The results show that the first and second correlation results correspond to the same position (((−3)+2)/2=−0.5), which means that the second sample data group is aligned with the first sample data group, i.e., $T_{sym,\ rx}=T_{sym,\ tx}$—the sampling clock at the signal receiver and the sampling clock at the signal transmitter are synchronous. In the middle comparison diagram, the position corresponding to the first correlation result is −0.5 (((−3)+2)/2=−0.5), and the position corresponding to the second correlation result is 1.5 (((−1)+4)/2=1.5), which means that the second sample data group is behind the first sample data group, i.e., $T_{sym,\ rx}>T_{sym,\ tx}$—the period of the sampling clock at the signal receiver is greater than the period of the sampling clock at the signal transmitter. In the right comparison diagram, the position corresponding to the first correlation result is −0.5 (((−3)+2)/2=−0.5), and the position corresponding to the second correlation result is −2.5 (((−5)+0)/2=−2.5), which means that the second sample data group is ahead of the first sample data group, i.e., $T_{sym,\ rx}<T_{sym,\ tx}$—the period of the sampling clock at the signal receiver is smaller than the period of the sampling clock at the signal transmitter. According to the positions of the numbers respectively corresponding to the first and second correlation values and the time difference between the two data frames corresponding to the two sample data groups, the comparison circuit 420 may generate the sample data group offset.

Figure 8:
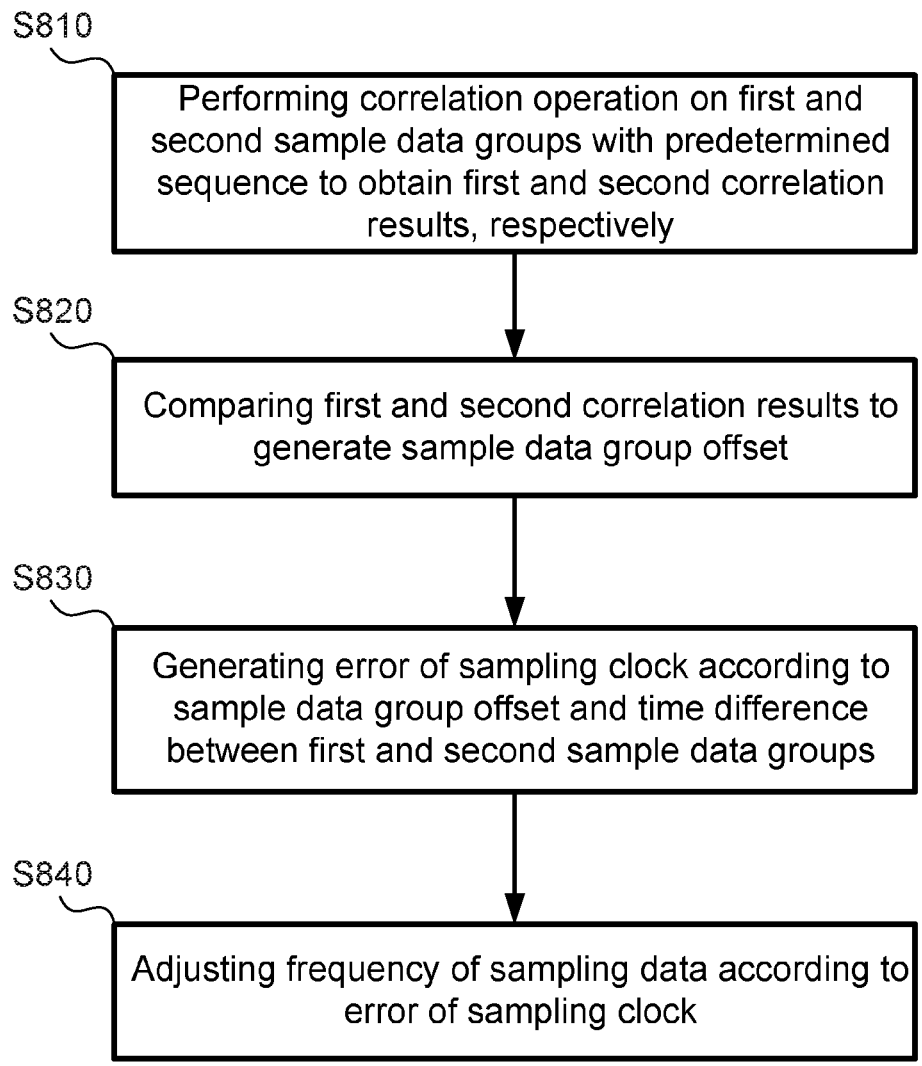
FIG. 8 is a flowchart of a method for calculating an error of a sampling clock according to an embodiment of the present invention.

FIG. 8 shows a flowchart of a method for calculating an error of a sampling clock of the present invention. In addition to the foregoing circuit for calculating an error of a sampling clock, the present invention correspondingly discloses a method for calculating an error of a sampling clock applied to a signal receiver. The method may be performed by the foregoing clock error calculation circuit 214 or an equivalent device. As shown in FIG. 8, the method according to an embodiment includes steps below.

In step S810, a correlation operation is performed on a first sample data group and a second sample data group with a predetermined sequence to obtain a first correlation result and a second correlation result, respectively. One sample data group corresponds to one data frame, and each frame includes a header having the predetermined sequence. With the correlation operation performed the sample data group according to the predetermined sequence, when the data in the predetermined format aligns with the header of the sample data group, a maximum correlation value is generated. Due to a multipath channel that a signal passes through during the transmission process, a correlation value that reflects an echo path having a lower energy level is also obtained in addition to the maximum correlation value that reflects a main path, as shown in FIG. 5. The first sample data group and the second sample data group may correspond to consecutive data frames or non-consecutive data frames.

In step S820, the first correlation result and the second correlation result are compared to generate a sample data group offset. As shown in FIG. 5, the first correlation result may aligned or non-aligned with the second correlation result. The non-aligned correlation result reflected on the sampling clock indicates that the sampling clocks at the signal transmitter and at the signal receiver are asynchronous. Thus, by determining the offset of the maximum correlation value, it can be determined whether the sampling clocks at the signal transmitter and at the signal receiver are synchronous, or one is behind or ahead of the other. When the correlation result displays a relatively simple diagram in which the offset of the maximum correlation value can be directly determined, as the middle and right comparison diagrams in FIG. 5, i.e., the second sample data group is respectively behind and ahead of the first sample data group by one sampling period $T_{sym,rx}$, it means that the sample data group offset between the two sample data groups is $T_{sym,rx}$. When the correlation result exhibits a more complex diagram, two approaches are provided by embodiments of the present invention to estimate the offset between the sample data groups. In one of the approaches, as shown in FIG. 6, a comparison window is set on the correlation result, and the correlation between two correlation results is calculated through moving the comparison windows to estimate the sample data group offset. In the other approach, as shown in FIG. 7, the correlation values are numbered, multiple correlation values with higher energy levels are selected according to a predetermined value, an average of the correlation values with the largest number and the smallest number is utilized as the offset position of the sample data group, and the sample data group offset is then calculated according to a difference between the offset positions of the two. Operation details of the two approaches of the embodiments of the present invention are disclosed in the description associated with the device of the present invention, and shall be omitted herein.

In step S830, the error of the sampling clock is generated according to the sample data group offset and a time difference between the first sample data group and the second sample data group. As the length of data frames is constant and the frequency of the sampling clock is known, the time difference between two sample data groups can be calculated. Thus, after obtaining the sample data group offset between two sample data groups in step S820, the error of the sampling clock can be calculated according to the sample data group offset and the time difference between the two sample data groups.

In step S840, the frequency of the sampling clock is adjusted according to the error of the sampling clock. After obtaining the error of the sampling clock, the frequency of the sampling clock can be accordingly adjusted, so that the sampling clock at the signal receiver can be synchronized with the sampling clock at the signal transmitter.

One person skilled in the art can understand details and possible implementation variations of the method in FIG. 8 according to the disclosure of the devices in FIG. 2 and FIG. 4 and the comparison diagrams of correlation results in FIG. 5 to FIG. 7. Without affecting the full disclosure and possible implementation, such repeated description is omitted herein. Further, the shapes, sizes, ratios and sequences of the steps in the drawings are examples for explaining the present invention to one person skilled in the art, not limiting the present invention. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a television compliant with the ATSC standard and a header carrying a pseudo-noise signal are taken as examples in the foregoing embodiments, based on the disclosure of the present invention, one person skilled in the art may appropriately apply the present invention to other types of signals and headers.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A circuit for calculating an error of a sampling clock according to a first sample data group and a second sample data group, each of the first sample data group and the second sample data group including a header having a first predetermined sequence, the circuit comprising:
    a correlation circuit, configured to respectively perform a correlation operation on the first sample data group and the second sample data group with the first predetermined sequence to obtain a first correlation result and a second correlation result;
    a comparison circuit, coupled to the correlation circuit, configured to compare the first correlation result and the second correlation result to generate a sample data group offset; and
    a calculation circuit, coupled to the comparison circuit, configured to generate the error of the sampling clock according to the sample data group offset and a time difference between the first sample data group and second sample data group;
    wherein the first correlation result comprises a first maximum correlation value, the second correlation result comprises a second maximum correlation value, and the comparison circuit generates the sample data group offset according to offsets of the first maximum correlation value and the second maximum correlation value.

2. The circuit according to claim 1, wherein the correlation circuit performs the correlation operation on the first correlation result and the second correlation result, and calculates the sample data group offset according to a result of the correlation operation.

3. The circuit according to claim 1, wherein the comparison circuit numbers a plurality of correlation values of the first correlation result and second correlation result, selects a first correlation value group from the first correlation result and a second correlation value group from the second correlation result, and generates the sample data group offset according to the plurality of numbers corresponding to the first correlation value group and the plurality of numbers corresponding to the second correlation value group.

4. The circuit according to claim 3, wherein the comparison circuit averages a maximum number and a minimum number corresponding to the first correlation value group to obtain a first average, averages the maximum number and the minimum number corresponding to the second correlation value group to obtain a second average, and utilizes a difference between the first and second averages as the sample data group offset.

5. The circuit according to claim 1, wherein the first sample data group and second sample data group have same data lengths.

6. A signal receiving circuit, comprising:
   a timing recovery circuit, configured to sample a first signal according to a sampling clock to generate a second signal, the second signal comprising a first sample data group having a first header and a second sample data group having a second header, the first header and the second header having a same predetermined sequence; and
   a clock error calculation circuit, coupled to the timing recovery circuit, for generating an error of the sampling clock according to a correlation between the predetermined sequence and the first and second sample data groups and a time difference between the first and second sample data groups, comprising:
   a correlation circuit, configured to respectively perform the correlation operation on the first sample data group and the second sample data group with the predetermined sequence to obtain a first correlation result and a second correlation result;
      a comparison circuit, coupled to the correlation circuit, configured to compare the first correlation result and the second correlation result to generate a sample data group offset; and
      a calculation circuit, coupled to the comparison circuit, configured to generate the error of the sampling clock according to the sample data group offset and a time difference between the first and second sample data groups;
   wherein the timing recovery circuit adjusts a frequency of the sampling clock according to the error of the sampling clock, the first correlation result comprises a first maximum correlation value, the second correlation result comprises a second maximum correlation value, and the comparison circuit generates the sample data group offset according to offsets of the first maximum correlation value and the second maximum correlation value.

7. The signal receiving circuit according to claim 6, wherein the correlation circuit performs the correlation operation on the first correlation result and the second correlation result, and calculates the sample data group offset according to a result of the correlation operation.

8. The signal receiving circuit according to claim 6, wherein the correlation circuit numbers a plurality of correlation values of the first correlation result and the second correlation result, selects a first correlation value group from the first correlation result and a second correlation value group from the second correlation result, and generates the sample data group offset according to the plurality of numbers corresponding to the first correlation value group and the plurality of numbers corresponding to the second correlation value group.

9. The signal receiving circuit according to claim 6, wherein the first sample data group and second sample data group have same data lengths.

10. A method for calculating an error of a sampling clock, the sampling clock utilized for sampling a signal to generate a first sample data group and a second sample data group, each of the first and second sample data groups including a header having a first predetermined sequence, the method comprising:
    performing a correlation operation by a correlation circuit on the first sample data group and the second sample data group with the first predetermined sequence to obtain a first correlation result and a second correlation result, respectively;
    comparing the first correlation result and the second correlation result by a comparison circuit to generate a sample data group offset, comprising:
       identifying a first maximum correlation value of the first correlation result;
       identifying a second maximum correlation value of the second correlation result; and
       generating the sample data group offset according to offsets of the first maximum correlation value and second maximum correlation value; and
    generating the error of the sampling clock by a calculation circuit according to the sample data group offset and a time difference between the first sample data group and second sample data group.

11. The method according to claim 10, wherein the step of comparing the first correlation result and second correlation result to generate the sample data group offset comprises:
    performing the correlation operation by said correlation circuit on the first correlation result and second correlation result, and calculating the sample data group offset according to a result of the correlation operation.

12. The method according to claim 10, wherein the step of comparing the first correlation result and second correlation result to generate the sample data group offset comprises:
    numbering a plurality of correlation values of the first correlation result and second correlation result;
    selecting a first correlation value group from the first correlation result;
    selecting a second correlation value group from the second correlation result;
    generating the sample data group offset according to the plurality of numbers corresponding to the first correlation value group and the plurality of numbers corresponding to the second correlation value group.

13. The method according to claim 12, wherein the step of generating the sample data group offset according to the plurality of numbers corresponding to the first correlation value group and the plurality of numbers corresponding to the second correlation value group comprises:
    averaging a maximum number and a minimum number corresponding to the first correlation value group to obtain a first average;
    averaging the maximum number and the minimum number corresponding to the second correlation value group to obtain a second average; and
    utilizing a difference between the first average and the second average as the sample data group offset.

14. The method according to claim 10, wherein the first sample data group and second sample data group have same data lengths.

* * * * *